Figure 1:
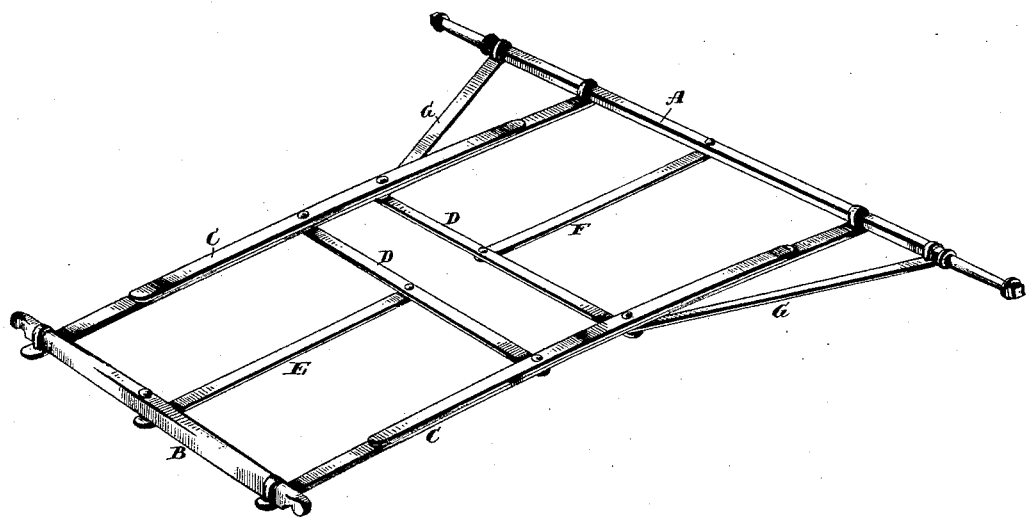

(No Model.)

C. C. HAYES.
SPRING GEAR FOR VEHICLES.

No. 413,057. Patented Oct. 15, 1889.

Witnesses
Chas. J. Williamson
Wm. C. Cross

Inventor
Charles C. Hayes,
per Chas. H. Fowler,
Attorney.

UNITED STATES PATENT OFFICE.

CHARLES C. HAYES, OF PENN YAN, NEW YORK.

SPRING-GEAR FOR VEHICLES.

SPECIFICATION forming part of Letters Patent No. 413,057, dated October 15, 1889.

Application filed July 24, 1889. Serial No. 318,583. (No model.)

*To all whom it may concern:*

Be it known that I, CHARLES C. HAYES, a citizen of the United States, residing at Penn Yan, in the county of Yates and State of New York, have invented certain new and useful Improvements in Running-Gear; and I do hereby declare that the following is a full, clear, and exact description of the same, reference being had to the annexed drawings, making a part of this specification, and to the letters of reference marked thereon.

This invention relates to certain new and useful improvements in running-gear for vehicles; and it has for its object to provide a running-gear in which the springs will work in unison with each other and serve as an equalizer.

The invention consists in the peculiar combinations and the construction, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 2:
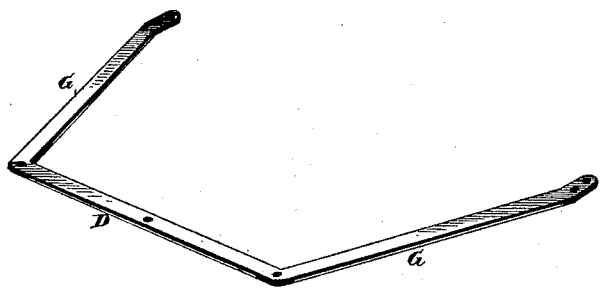

Figure 1 is a perspective view of a running-gear embodying my invention. Fig. 2 is a like view of a spring employed therein.

Referring now to the details of the drawings by letter, A designates the rear axle, and B the front head-block.

C are side springs attached at one end to the rear axle and at the other to the head-block by any suitable means, preferably, however, by means of the clips shown.

D are cross-springs connected at their ends to the side springs C, near the center thereof, a short distance apart, as shown in Fig. 1.

E is a spring connected to the king-bolt at *a* and at the other end to the front cross-spring D.

F is a similar spring attached at its forward end to the rear of the cross-springs D, and at its rear end to the rear axle, as shown.

G are springs attached at their rear ends to the rear axle and incline forward, and are attached to the side springs and to the ends of the rear cross-spring D, a single clip serving as the connection between these parts.

Instead of forming the rear cross-spring D and the springs G separately, as shown in Fig. 1, I sometimes prefer to form these parts all integral, as shown in Fig. 2, and attach them in the same relative positions as those shown in Fig. 1. They serve the same function in either case; but the form shown in Fig. 2 makes less parts.

What I claim as new is—

1. The combination, with the rear axle and front head-block, of the side springs connecting the axle and head-block, the cross-springs connecting the side springs, the longitudinal spring connected at its front end with the king-bolt, and the rear longitudinal spring connecting the rear cross-spring with the rear axle, and the inclined springs extending from the axle to the side bars at their intersection with the rear cross-spring, substantially as shown and described.

2. The combination, with the rear axle and front head-block, of the side springs connecting the axle and head-block, the cross-springs connecting the side springs, the longitudinal spring connected at its forward end with the king-bolt and at its rear end to the front cross-spring, the rear longitudinal spring connecting the rear cross-spring with the rear axle, and the inclined springs connected with the rear axle and attached to the side bars at the point of intersection of the rear cross-spring, substantially as shown and described.

In testimony that I claim the above I have hereunto subscribed my name in the presence of two witnesses.

CHARLES C. HAYES.

Witnesses:
 ALFRED CROSBY,
 BYRON EATON.